US006498715B2

(12) United States Patent
Lee et al.

(10) Patent No.: US 6,498,715 B2
(45) Date of Patent: Dec. 24, 2002

(54) STACK UP TYPE LOW CAPACITANCE OVERVOLTAGE PROTECTIVE DEVICE

(75) Inventors: Chun-Yuan Lee, Hsin Chu Hsien (TW); Kang-Neng Hsu, Hsin Chu Hsien (TW)

(73) Assignee: Inpaq Technology Co., Ltd., Miao Li Hsien (TW)

(*) Notice: Subject to any disclaimer, the term of this patent is extended or adjusted under 35 U.S.C. 154(b) by 0 days.

(21) Appl. No.: 09/854,632

(22) Filed: May 15, 2001

(65) Prior Publication Data

US 2002/0171995 A1 Nov. 21, 2002

(51) Int. Cl.$^{7}$ .................................................. H01G 4/06

(52) U.S. Cl. ..................... 361/313; 361/312; 361/321.2

(58) Field of Search .............................. 361/301.4, 303, 361/304, 306.1, 306.3, 309, 312, 313, 321.2, 329; 257/303, 306, 310, 529, 532

(56) References Cited

U.S. PATENT DOCUMENTS 5,311,053 A * 5/1994 Law et al. .................. 257/529

* cited by examiner

*Primary Examiner*—Anthony Dinkins
(74) *Attorney, Agent, or Firm*—Troxell Law Offices PLLC

(57) ABSTRACT

Stack up type low capacitance overvoltage protective device is composed of a substrate; a conductive low electrode layer formed on the substrate; a voltage sensitive material layer formed on the conductive lower electrode layer; and a conductive upper electrode layer formed on the voltage sensitive material layer.

5 Claims, 7 Drawing Sheets

STACK UP TYPE LOW CAPACITANCE OVERVOLTAGE PROTECTIVE DEVICE

BACKGROUND OF THE INVENTION

1. Field of the Invention

The present invention relates to stack up type low capacitance overvoltage protective device, in particular to stack up type low capacitance overvoltage protective device formed on a substrate and having a construction of a double layered electrode with a voltage sensitive material interposed therebetween.

2. Description of the Prior Art

It is a well known fact that an overvoltage will definitely cause a severe damage to an electrical system. To cope with increasing destructive threat to the speedy and more sophisticated present low voltage system, the intensification for protection to a low voltage system having aforesaid trend becomes more and more important.

Following the increase of system frequency, it is important to reduce the inherent capacitance of an overvoltage protective element as low as possible so as to speed up its response time, by this reasons it is the present tendency to reduce the capacitance of the overvoltage protective device as low as possible to meet the requirement, at the same time, to keep its critical break down voltage to an impulse or surge wave in a low value, but to keep its discharge voltage, ie, the IR drop between its terminal at a proper level such that the follower power current can be interrupted thereby potential stress across the equipment is protected to the lowest feasible value.

There are a plurality of materials known already to be relevantly applicable for use as overvoltage protection materials, among them zinc oxide with property of variable resistance is a preferable selection. There was an element disclosed in U.S. Pat. No. 4,726,991 having a structure that an insulation layer with a thickness smaller than several hundreds A (angstroms) covered with a conductive or a semiconductive powder. In addition, there have been disclosed a plurality of analogous voltage sensitive materials made of mixed powders of various conductive, semiconductive or nonconductive materials with a binder, for example, U.S. Pat. Nos. 3,685,026, 3,685,028, 4,977,357, 5,068,634, 5,260,848, 5,294,374, 5,393,596 and 5,807,509. All these materials are usable for the present invention.

A chip type laminated variable resistor is one of the widely used element, but it has an inherent disadvantage of having relatively higher capacitance, although its capacitance may be reduced to as low as approximately 3 pF by adjusting its construction. Yet the aforesaid critical breakdown voltage and clamping voltage are relatively brought up. A specially constructed semiconductor diode is another choice of the overvoltage protective device, but its capacitance is still not able to overcome the threshold value of below 10 pF.

The structure of the low capacitance overvoltage protective device is characterized by that there is a microgap formed between the two electrodes at both ends of the device with a voltage sensitive material filled therein. Therefore, obtaining a very low capacitance below 1 pF by the fact that the area of the electrode is so small. There are two already known structures of such device: The first one disclosed by U.S. Pat. Nos. 6,023,028 and 5,974,661 formed by common printed circuit board (PCB) fabrication process is shown in FIG. 1 wherein it is composed of a substrate 100 made of an insulation sheet material; a right and a left separated electrode layers 112 and 111 generally formed of copper foil on the insulated substrate 100; a voltage sensitive material layer 120 formed on the right and left electrode layers 112,111 and therebetween; and a main protecting layer 130 covering the electrode layers 111,112 and on the material layer 120. The second one disclosed by U.S. Pat. No. 6,013,358 is formed by thick film printing process is shown in FIG. 2, wherein it is composed of a ceramic substrate 200; a buffer glass material layer 220 divided with minor gaps by cutting formed on the substrate 200; a right and a left electrode layers 232, 231 formed by printing process on the glass material layer 220, these two electrode layers 232, 231 being separating and covering partially the glass material layer 220; a voltage sensitive material layer 240 formed on the electrode layers 232, 231 and extending into the buffer glass material layer 220; and a protecting layed 250 formed on the uppermost part of the whole construction. This overvoltage protective device formed with thick film printing process must employ a special cutting microgaps process to form its essential structure. Although these two devices fabricated with aforementioned process can easily attain a low capacitance property for its main structure, yet there are following inherent shortcomings concerning their fabrication processes:

1. In the PCB process, there is an inherent limitation that the gap distance can not be formed as small as desireously possible to obtain favorably low critical break down voltage and discharge voltage.
2. The stack up structure can be relatively easily formed with thick film printing process incorporated with special cutting process for forming the microgaps than with the former PCB process, but special preparation of extra tools is needed to carry out the cutting process which results in exorbitantly high production cost. Besides, the burrs inadvertently produced on the cutting surfaces between the electrodes may result in a point discharge therebetween and lower the yield rate of production. If slows down the cutting process for evading such an unexpected result, the production cost further rises up.

SUMMARY OF THE INVENTION

Aiming at the above depicted problems, the present invention is to propose a newly developed construction and fabrication process for a stack up type low capacitance overvoltage protective device capable of solving those problems which the conventional techniques encounter.

It is an object of the present invention to provide a stack up type low capacitance overvoltage protective device whose low capacitance character can be attained through controlling surface area of printed stack up elements and thickness of a voltage sensitive material layer, the capacitance can be reduced to as low as below 1 pF.

It is another object of the present invention that the thickness of the voltage sensitive material layer can be adjusted by the printing tools and printing parameters so as to keep both the critical breakdown voltage and the clamping voltage of the overvoltage protective device at a reasonably low level.

It is a further object of the present invention that this overvoltage protective device can be fabricated by thick film process so that mass production can be expected with a low production cost by utilizing commonly equipment. Also, it is expected to eliminate point discharge phenomenon by forming surfaces of two adjacent electrodes as smooth as possible.

To achieve these and other objects of the present invention, the stack up type low capacitance overvoltage protective device is composed of a ceramic substrate, a separated conductive lower electrode layer and a conductive upper electrode lead wire layer both formed by printing process on the substrate; a voltage sensitive material layer stacked up on the conductive lower electrode layer by printing process; and a conductive upper electrode layer stacked up on both the conductive upper electrode lead wire layer and the voltage sensitive material layer by printing process. In this version, the construction of a main structure for the present invention is completed, afterward a protective layer is enclosed over this main structure.

The objects, advantages and features of the present invention will become more readily appreciated and understood from a consideration of the following detailed description of preferred embodiments when taken together with the accompanying drawings appended below.

DETAILED DESCRIPTION OF THE PREFERRED EMBODIMENTS

Figure 1:
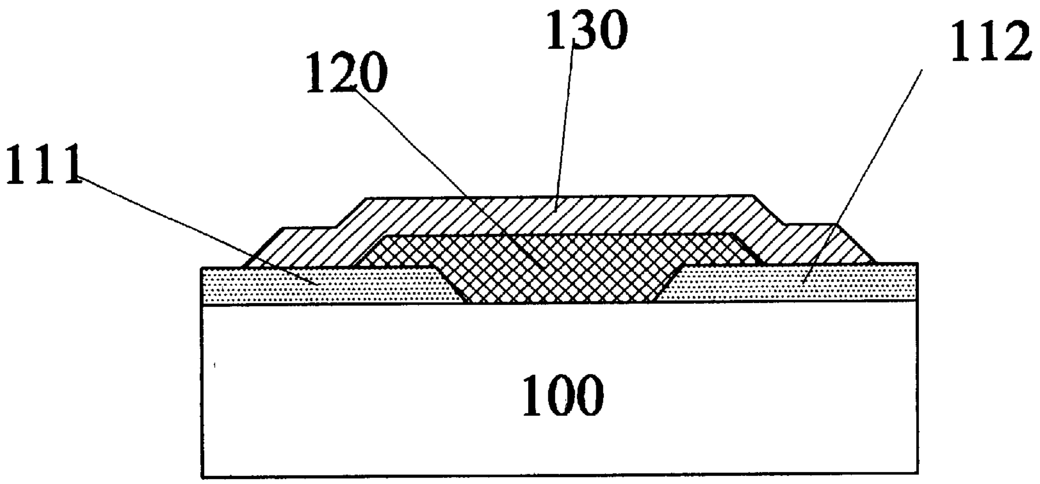
FIG. 1 PRIOR ART
FIG. 1 is a cross sectional view of a conventional PCB type low capacitance overvoltage protective device.
Figure 2:
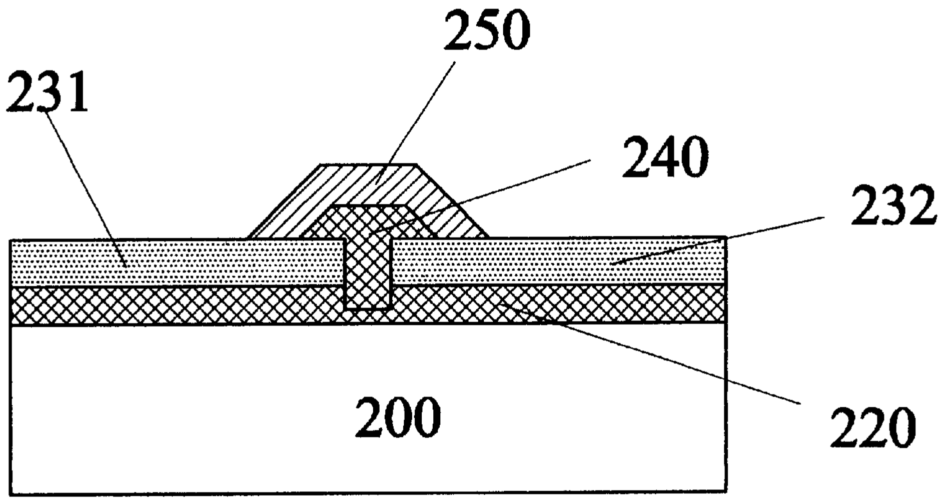
FIG. 2 PRIOR ART
FIG. 2 is a cross sectional view of a conventional thick film print type microgap low capacitance overvoltage protective device.
Figure 3:
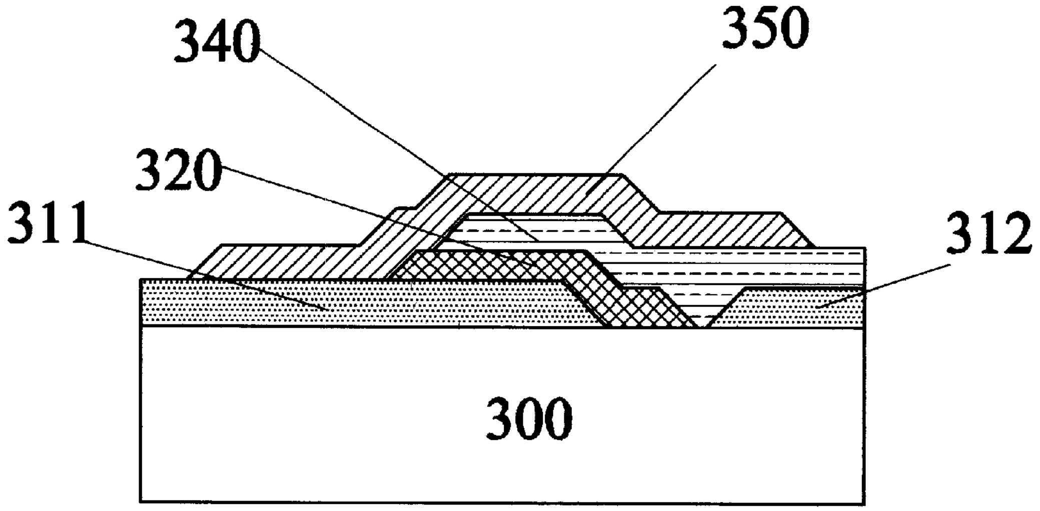
FIG. 3 is a cross sectional view of the stack up type low capacitance overvoltage protective device in an embodiment of the present invention.
Figure 4:
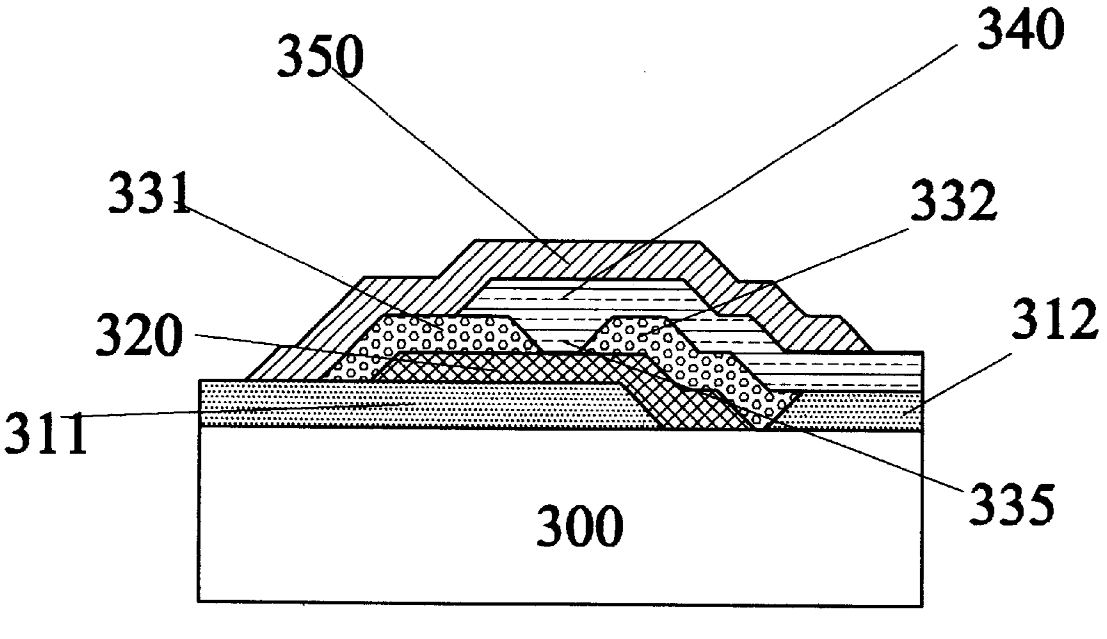
FIG. 4 is a cross sectional view of the stack up type low capacitance overvoltage protective device in another embodiment of the present invention

For understanding the structure of the present invention, reference should be made to FIGS. 3 and 4. As shown in FIG. 3, in an embodiment, the stack up type low capacitance overvoltage protective device of the present invention is composed of a ceramic substrate 300, a separated conductive lower electrode layer 311 and a conductive upper electrode lead wire layer 312 both formed with printing process on the substrate 300; a voltage sensitive material layer 320 stacked up on the conductive lower electrode layer 311 by printing process; and a conductive upper electrode layer 340 stacked up on both the conducive upper electrode lead wire layer 312 and the voltage sensitive material layer 320 by printing process. In this version, the construction of the main structure for the present invention is completed, afterwards a protective layer 350 is enclosed over this main structure.

Figure 5A:
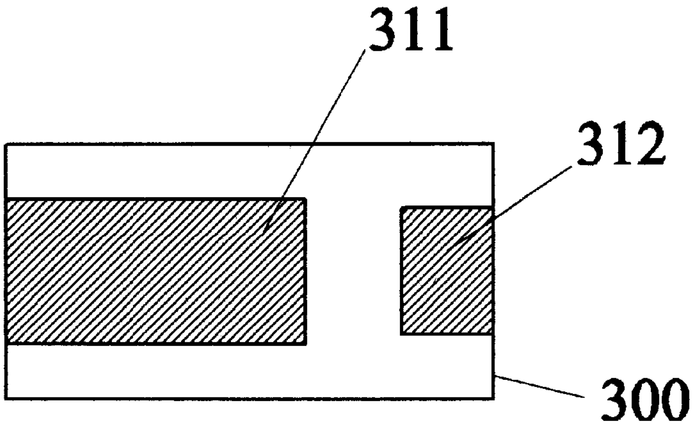
FIGS. 5A to 5E are plane views showing a fabrication process of the present invention.
Figure 5B:
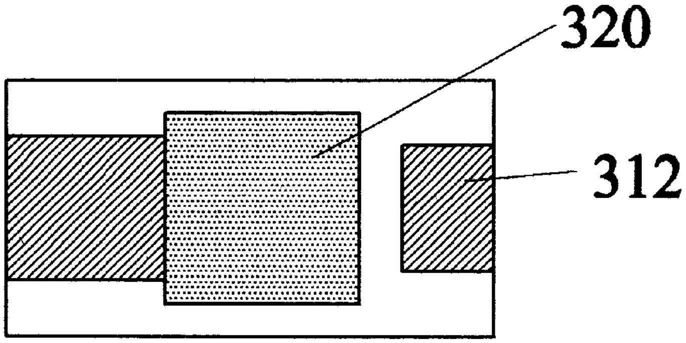
Figure 5C:
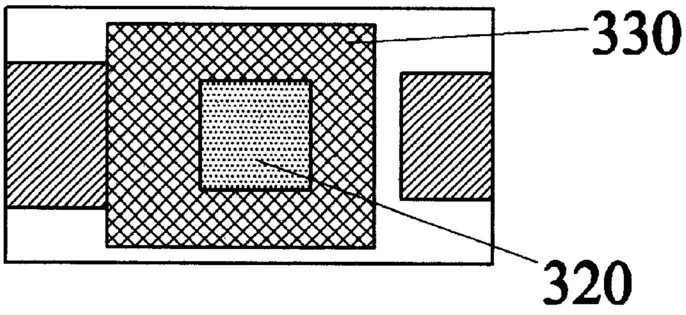
Figure 5D:
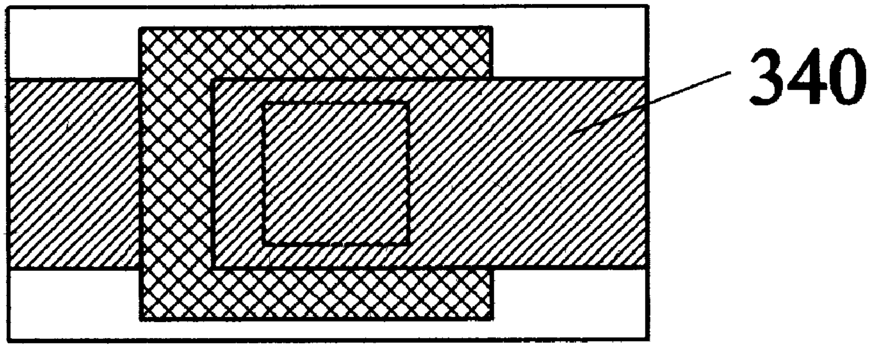
Figure 5E:
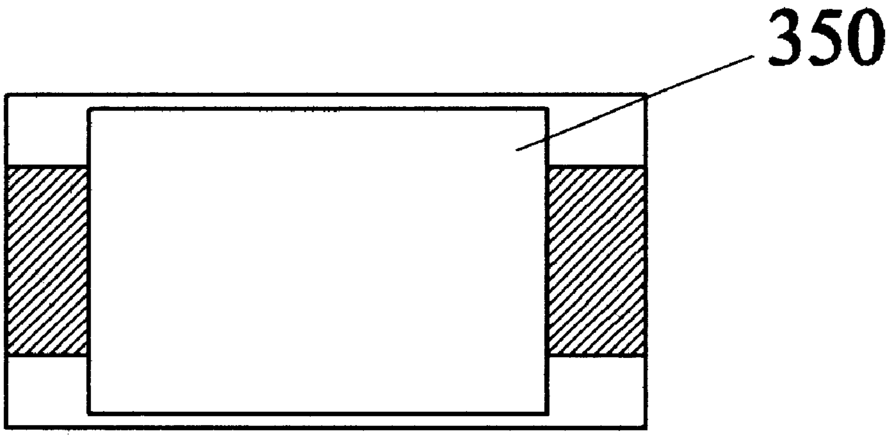
Figure 6A:
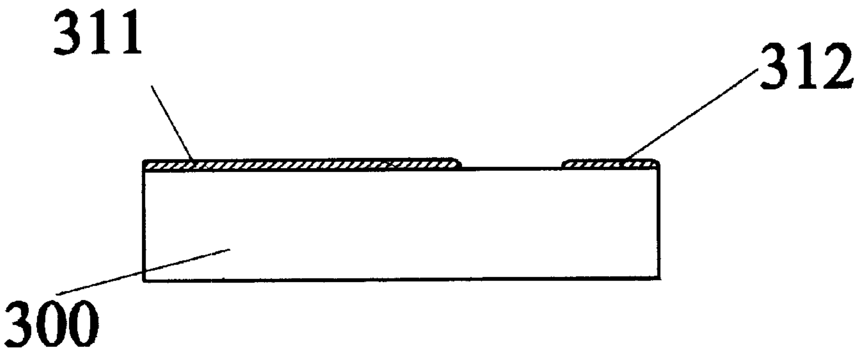
FIGS. 6A to 6E are cross sectional view of FIGS. 5A to 5E.
Figure 6B:
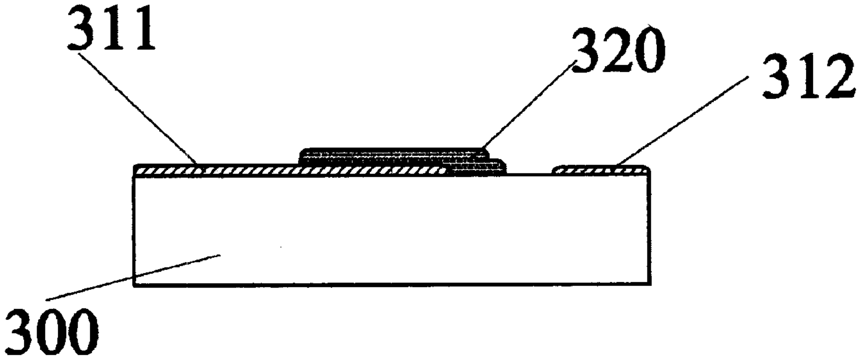
Figure 6C:
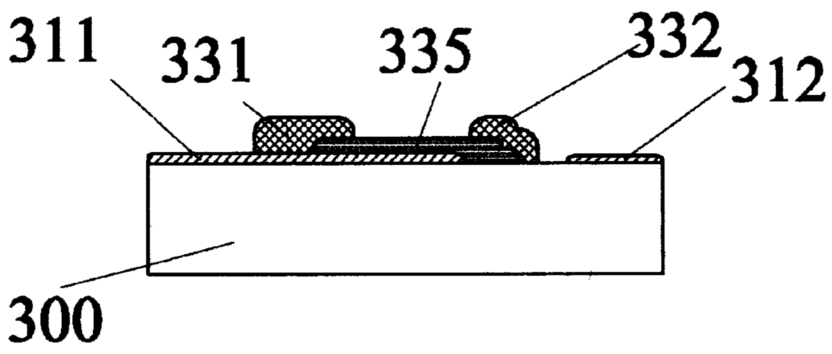
Figure 6D:
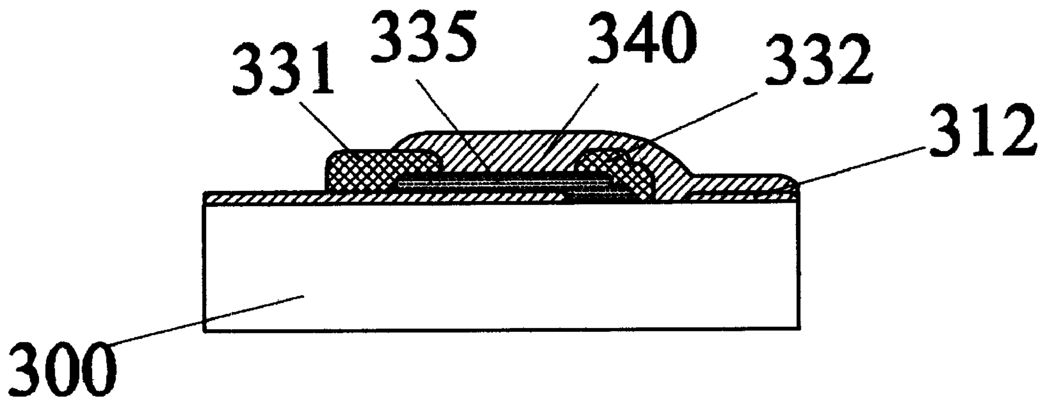
Figure 6E:
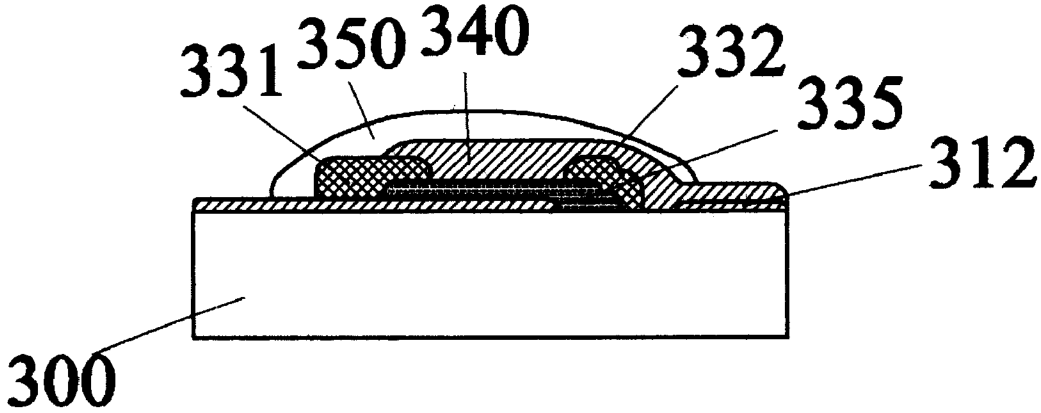

Another typical main structure of the present invention is shown in FIG. 4, whereas the fabrication process of the structure shown in FIG. 4 is illustrated in order from FIG. 5A to FIG. 5E, and FIG. 6A to FIG. 6B. A printed conductive lower electrode layer 311 and printed conductive upper electrode lead wire layer 312 (refer to FIGS. 5A and 6A) are formed on the substrate 300. The material of the conductive electrode is Ag, Pt, Pd or Au, or their alloy. A voltage sensitive material layer 320 (as shown in FIG. 5B and FIG. 6B) is stacked up on the printed conductive lower electrode layer 311 by printing process. One of voltage sensitive material is doped ZnO which was made disc type varistor and multilayer varistor. A limited capacitance low dielectric glass material layers 331 and 332 (as shown in FIG. 5C and FIG. 6C) is stacked up on the voltage sensitive material layer 320 by printing process. And an electrode connection hole 335 is reserved on the voltage sensitive material layer 320, the area of the hole 335 can be determined according to actual need. By so the capacitance of the device can be further minimized. Next, a conductive upper electrode lead wire layer 312 is formed on the limited capacitance low dielectric glass material layers 331 and 332; and a conductive upper electrode layer 340 (as shown in FIG. 5D and FIG. 6D) is stacked up on the reserved hole 335 of the voltage sensitive material 320 by printing process thus completing the main structure of the present invention. Finally, a protective layer 350 (as shown in FIG. 5E and FIG. 6E) is enclosed over the main structure.

In the scope of the present invention, the typical main structure of the device is constructed on a ceramic substrate, actually this substrate can be formed of glass, silicon wafer or any high molecular substrates (RF4). High molecular materials or a ceramic material having a low dielectric constant can be used instead of glass used in forming the main structure of the present invention.

It is understood from the detailed description of the embodiments that the main structure of the present invention can achieve the object of minimizing capacitance by only comprising simple components the conductive lower electrode layer, the voltage sensitive material layer, and the conductive upper electrode layer by stacking up construction. As for the thickness of the voltage sensitive material, it is adjustable between 3 $\mu$m to 150 $\mu$m according to property of the material used and the parameters of the facilities and tools used in printing process. If it is intended to further reduce the capacitance, addition of an extra capacitance limited low dielectric glass printed material layer is able to satisfy the requirement.

Figure 7:
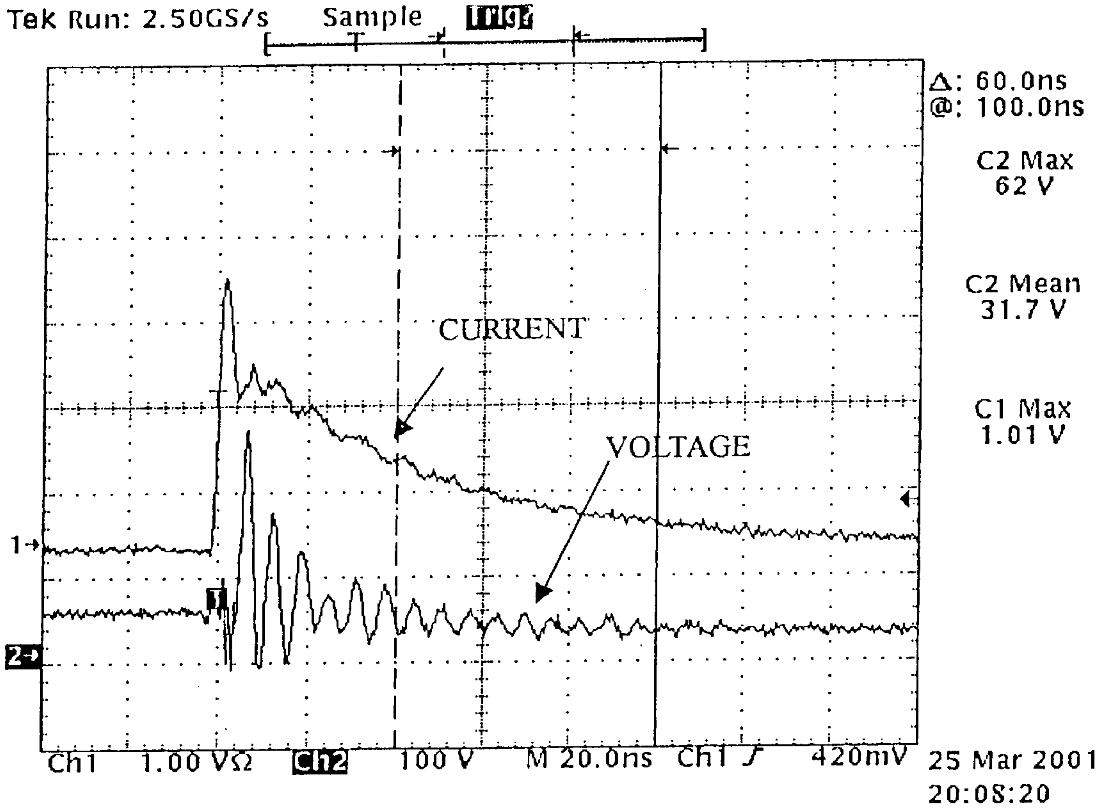
FIG. 7 is a discharge characteristic curve of the present invention against surge voltages.

FIG. 7 is a discharge characteristic curve of the present invention against 8 KV surge voltage according to IEC61000-4-2 standard. It can be observed from the current discharge curve 1 that the maximum discharge current is 30 A; while from the terminal voltage curve 2, the peak value is limited below 300V The voltage sensitive material employed by the device for this experiment was made of zinc oxide having 50 $\mu$m thickness with a 0.05 $mm^2$ connection hole thereon, and the device has a capacitance of 0.4 pF.

If emerges from the description of the above embodiments that the invention has several noteworthy advantages, in particular:

1. Low capacitance character can be attained through controlling surface area of printed stack up components, low dielectric material layer and thickness of the voltage sensitive material layer, the capacitance can be reduced as low as below 1 pF.
2. The thickness of the voltage sensitive material layer can be adjusted by the printing facilities, tools and parameters so as to keep both the critical breakdown voltage and the clamping voltage of the device at a reasonably low level.
3. The device can be fabricated by thick film printing process so that mass production can be expected with a low production cost by utilizing commonly usable facilities and equipment, also it is possible to eliminate point discharge by forming facing surfaces of two adjacent electrodes in smooth plane surfaces.

Those who are skilled in the art will readily perceive how to modify the invention. Therefore, the appended claims are to be construed to cover all equivalent structures which fall within the true scope and spirit of the invention.

What is claimed is:

1. Stack up type low capacitance overvoltage protective device comprising: a substrate; a conductive lower electrode layer formed on said substrate; a voltage sensitive material layer formed on said conductive lower electrode layer; a low dielectric material layer having a reserved connection hole formed on said voltage sensitive material layer; and a conductive upper electrode layer formed on said voltage sensitive material.

2. The overvoltage protective device of claim 1, wherein a thickness of said voltage sensitive material layer is 3 $\mu$m to 150 $\mu$m.

3. The overvoltage protective device of claim 1, wherein the material used for said low dielectric material layer is glass.

4. The overvoltage protective device of claim 1, wherein the material used for said low dielectric material layer is ceramic.

5. The overvoltage protective device of claim 1, wherein the material used for said low dielectric material layer is high molecule material.

* * * * *